United States Patent [19]
Iijima

[11] Patent Number: 6,031,975
[45] Date of Patent: *Feb. 29, 2000

[54] NETWORK SYSTEM AND SERVER

[75] Inventor: Kouichi Iijima, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/842,500

[22] Filed: Apr. 24, 1997

[30] Foreign Application Priority Data

Apr. 26, 1996 [JP] Japan .................................... 8-107927

[51] Int. Cl.⁷ .............................. B41B 15/00; H01J 13/00
[52] U.S. Cl. ......................................... 395/114; 395/200.8
[58] Field of Search .................................... 395/114, 101, 395/112, 163, 853, 888, 200.08, 200, 250; 358/403, 402, 407; 364/154, 519; 379/89; 382/232, 321; 340/524

[56] References Cited

U.S. PATENT DOCUMENTS

| | | | |
|---|---|---|---|
| 4,167,322 | 9/1979 | Tano et al. | 340/524 |
| 5,010,581 | 4/1991 | Kanno | 382/232 |
| 5,179,637 | 1/1993 | Nardozzi | 395/114 |

FOREIGN PATENT DOCUMENTS

| | | | |
|---|---|---|---|
| 0550191 | 7/1993 | European Pat. Off. | G03G 15/00 |
| 0651296 | 3/1995 | European Pat. Off. | G03G 15/00 |
| 0 651 296 A2 | 5/1995 | European Pat. Off. | |
| 7-121332 | 5/1995 | Japan . | |
| 07271533 | 10/1995 | Japan . | |

OTHER PUBLICATIONS

Kate Barness, 10 Minute Guide to Window™ 3.1, copyriight 1992 by SAMS, p. 5, 1992.

*Primary Examiner*—Jose L. Couso
*Assistant Examiner*—Duy M. Dang
*Attorney, Agent, or Firm*—Armstrong, Westerman, Hattori, McLeland & Naughton

[57] ABSTRACT

A network system makes it possible to construct a multi-function system using an existing network system currently employed in an office. The network system includes: (a) a printer for carrying out printing; (b) a plurality of clients for outputting various requests including a printing request and facsimile transmission request; (c) a server designed to carry out processing in response to requests sent from the plurality of clients, connected on a facsimile transmission/reception line, and composed of (1) a unit that, when a client outputs a printing request, outputs a printing instruction to the printer, (2) a unit that, when a client outputs a facsimile transmission request, transmits data over the facsimile transmission/reception line, and (3) a unit that, when data is transmitted over the facsimile transmission/reception line, receives the transmitted data.

10 Claims, 13 Drawing Sheets

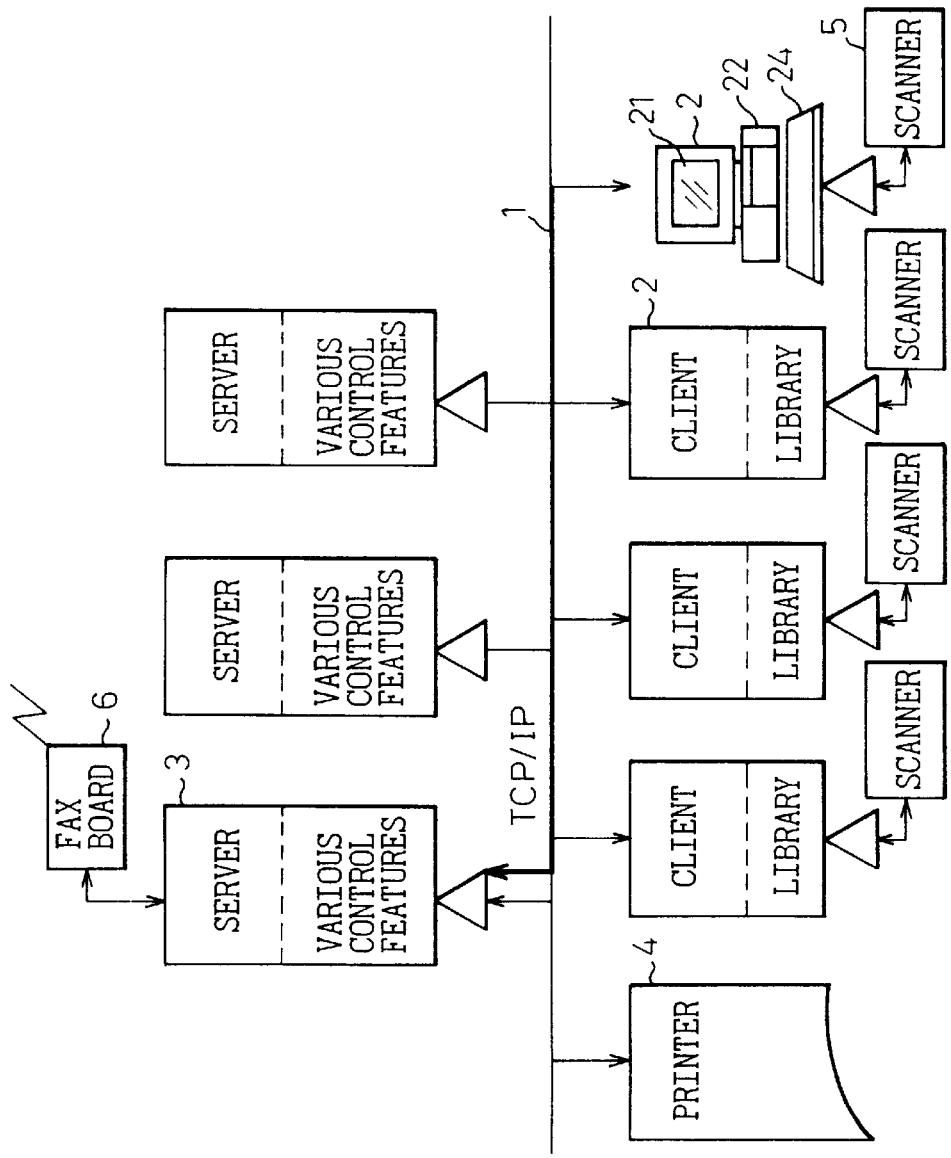

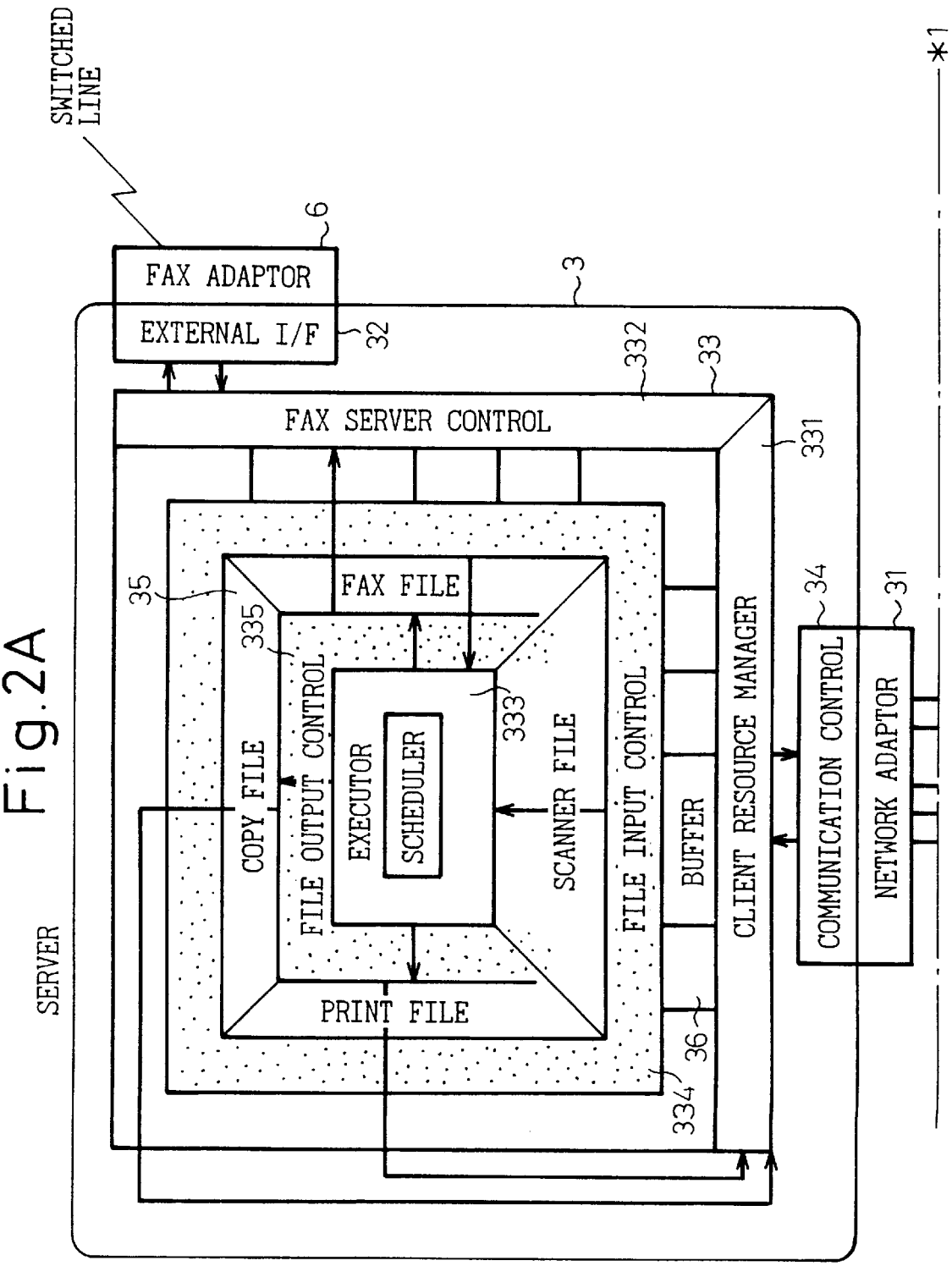

NETWORK SYSTEM AND SERVER

BACKGROUND OF THE INVENTION

1. Field of the Invention

The present invention relates to a network system in which a plurality of clients for outputting requests, a server designed to carry out processing in response to requests sent from the plurality of clients and connected to a facsimile transmission/reception line, and a printer for carrying out printing are interconnected over a network.

2. Description of the Related Art

In recent years, word processors for creating documents, a printer for printing created documents, a copier for copying papers, a facsimile system for transmitting papers, and personal computers in each of which software for carrying out calculations is installed have become requisites in an office. For installing these apparatuses in an office, a large installation area is needed and a large amount of money must be invested in facilities.

By the way, a network system in which a plurality of personal computers operating as stand-alone machines are interconnected over a network such as a LAN in order to share resources such as a filing system and printer has prevailed in offices. Within the system, printing by the printer or writing and reading data in or from the filing system is enabled by issuing a request from a personal computer over the network.

However, even in an office in which such a network system is constructed, a copier and facsimile system are, as mentioned above, still necessary. Recently, therefore, a system in which a composite machine into which a printer, copier, and facsimile system are integrated is connected over a network and, for example, a system as described in Japanese Unexamined Patent Publication No. 7-271533 or 7-121332 has been developed.

In such a system, for example, as disclosed in the Japanese Unexamined Patent Publication No. 7-271533, computers are connected over a network, and a composite copier is connected to the network. When this kind of network system is newly constructed, an amount of money to be invented in facilities can be minimized.

However, when a system in which a plurality of computers, a printer, and the like are interconnected over a network has already been constructed, if an apparatus such as a composite machine is additionally connected over the network, the printer and other apparatuses which are already connected are wasted. Network systems have already been constructed in many offices nowadays. There is an increasing demand for a system for making the most of an existing system.

SUMMARY OF THE INVENTION

An object of the present invention is to provide a system capable of making the most of an already-constructed network system and minimizing an amount of money to be invested in facilities.

According to the present invention, there is provided a network system comprising: (a) a printer for carrying out printing; (b) a plurality of clients for outputting various requests including a printing request and facsimile transmission request; (c) a server designed to carry out processing in response to requests sent from the plurality of clients, connected on a facsimile transmission/reception line, and composed of (1) a means that, when any client issues a printing request, outputs a printing instruction to the printer, (2) a means that, when any client issues a facsimile transmission request, transmits data over the facsimile transmission/reception line, and (3) a means that, when data is transmitted over the facsimile transmission/reception line, receives the transmitted data.

According to the present invention, there is provided a server constituting a network system together with a plurality of clients for outputting requests, and a printer for carrying out printing, and comprising: (a) a means for carrying out processing in response to requests sent from the plurality of clients; (b) a means for transmitting or receiving data over a connected facsimile transmission/reception line on which the server is connected; and (c) a means for distinguishing each object data of printout requests sent from the clients, object data of facsimile transmission requests sent from the clients, and data received over the facsimile transmission/reception line from each other, and storing the object data.

According to the present invention, there is provided a storage device for a program to be installed in a server constituting a network system together with a plurality of clients for outputting requests and a printer for carrying out printing, carrying out processing in response to requests sent from the plurality of clients, and being connected on a facsimile transmission/reception line. The program comprises the steps of: (a) receiving printout requests, copy requests, facsimile transmission requests from the clients; (b) receiving data transmitted over the facsimile transmission/reception line; (c) when receiving a printout request or copy request from a client or receiving data over the facsimile transmission/reception line, requesting the printer for printouts; and (d) when receiving a facsimile transmission request from a client, transmitting data over the facsimile transmission/reception line.

According to the present invention, there is provided a network system, comprising: (a) a printer for carrying out printing; (b) a scanner for carrying out scanning; (c) a plurality of clients for outputting various requests including a printing request, copying request, and facsimile transmission request; and (d) a server designed to carry out processing in response to requests sent from said plurality of clients, connected on a facsimile transmission/reception line, and composed of: (1) a means that, when a client issues a printing request, outputs a printing instruction to said printer, (2) a means that, when a client issues a copying request, inputs a scanning instruction to said scanner and outputs a copying instruction to said printer, (3) a means that, when a client issues a facsimile transmission request, transmits data over said facsimile transmission/reception line, and (4) a means that, when data is transmitted over said facsimile transmission/reception line, receives the transmitted data.

BRIEF DESCRIPTION OF THE DRAWINGS

Further features and advantages of the present invention will be apparent from the following description with reference to the accompanying drawings, in which:

FIG. 1 is a diagram showing the configuration of a network system;

FIGS. 2A and 2B are a diagram showing the internal control configurations of a client and server;

DESCRIPTION OF THE PREFERRED EMBODIMENTS

Figure 2B:
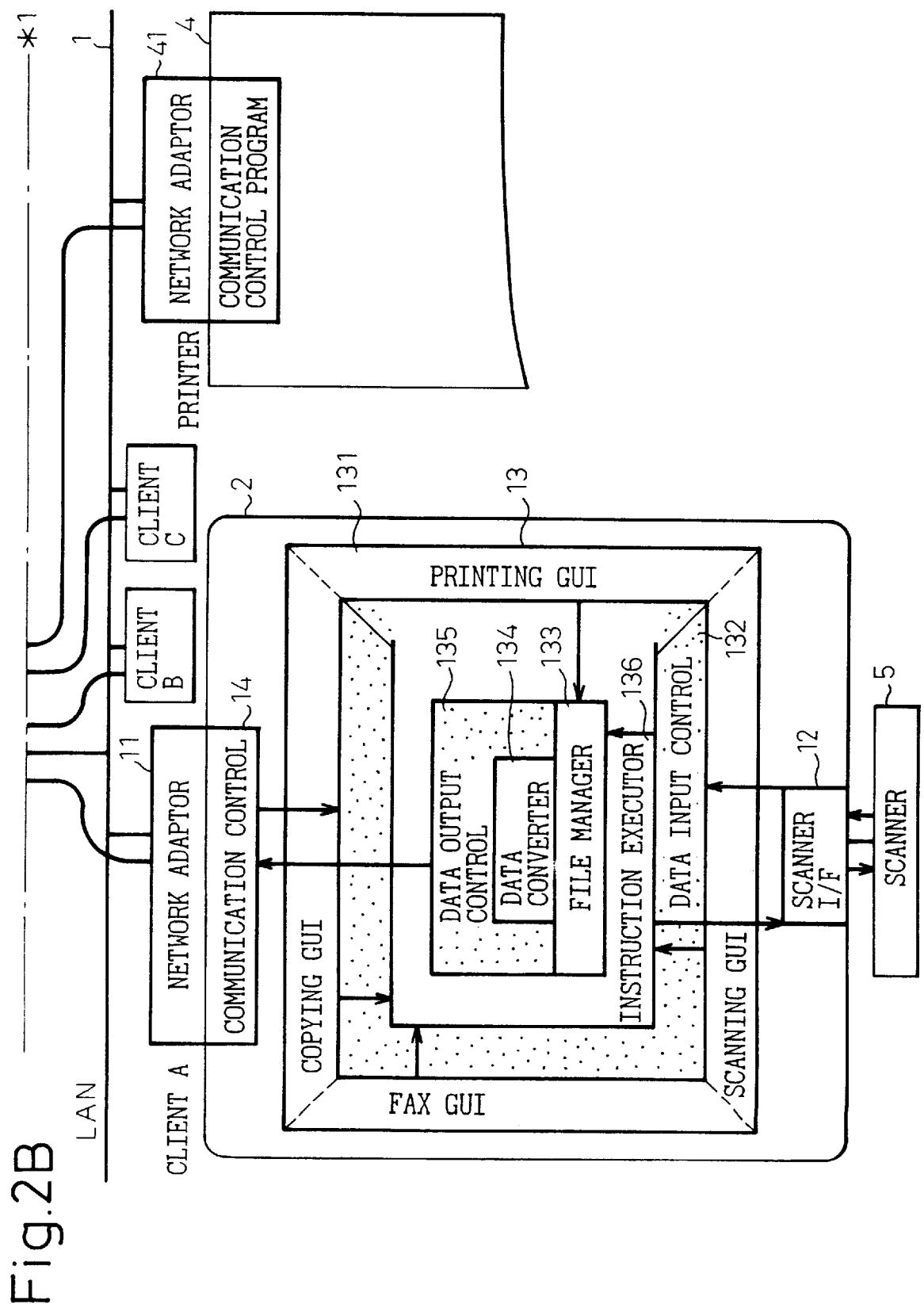

FIG. 1 is a diagram showing the configuration of a network system. Clients 2, a server 3, and a printer 4 are interconnected over a network 1. The network is a LAN in which a communications protocol TCP/IP is employed.

A scanner 5 is connected to each of the clients 2, whereby inputting images on paper is enabled. Each of the clients 2 is composed of a display unit 21 (CRT), a main unit 22, and a keyboard 24. The main unit 22 includes devices incorporated in an ordinary personal computer, such as, a CPU and hard disk unit.

A FAX board (FAX adaptor) designed for facsimile transmission or reception is connected to the server 3. The FAX board 6 is connected on a switched line such as a public line, a private line, or an ISDN line, whereby a server transmits or receives analog data to or from another server over the line.

If a plurality of servers 3 are connected within one network system and designed to cope with different communications protocols, computers conformable to various communications protocols can be interconnected within one network system. Moreover, the network system becomes a general-purpose system.

The clients 2 and server 3 are typical personal computers. Personal computers enjoy high processing speeds nowadays. Moreover, personal computers include large-capacity memories. When software necessary for a personal computer to function as a client or server is installed in the personal computer, the capability of a client or server can be realized. When a higher performance system is requested, workstations can be used to construct clients or a server and a multifunction system enjoying a high processing speed can be constructed.

When software is installed in such clients or a server, a system having multiple functions such as a copying function, a printing function, and a facsimile transmission/reception function can be constructed.

FIGS. 2A and 2B are a diagram showing the internal control configurations of a client 2 and server 3. The client 2 includes a network adaptor 11, a communication control unit 14 for controlling data transfer over a network, a scanner interface 12 for connecting a scanner 5, and a client software 13.

The client software 13 includes software (GUI) 131 for displaying and outputting a guide for instructing an operator to enter necessary information for the purpose of providing multiple functions. The GUI 131 makes it possible to use the multiple functions readily.

Figure 3:
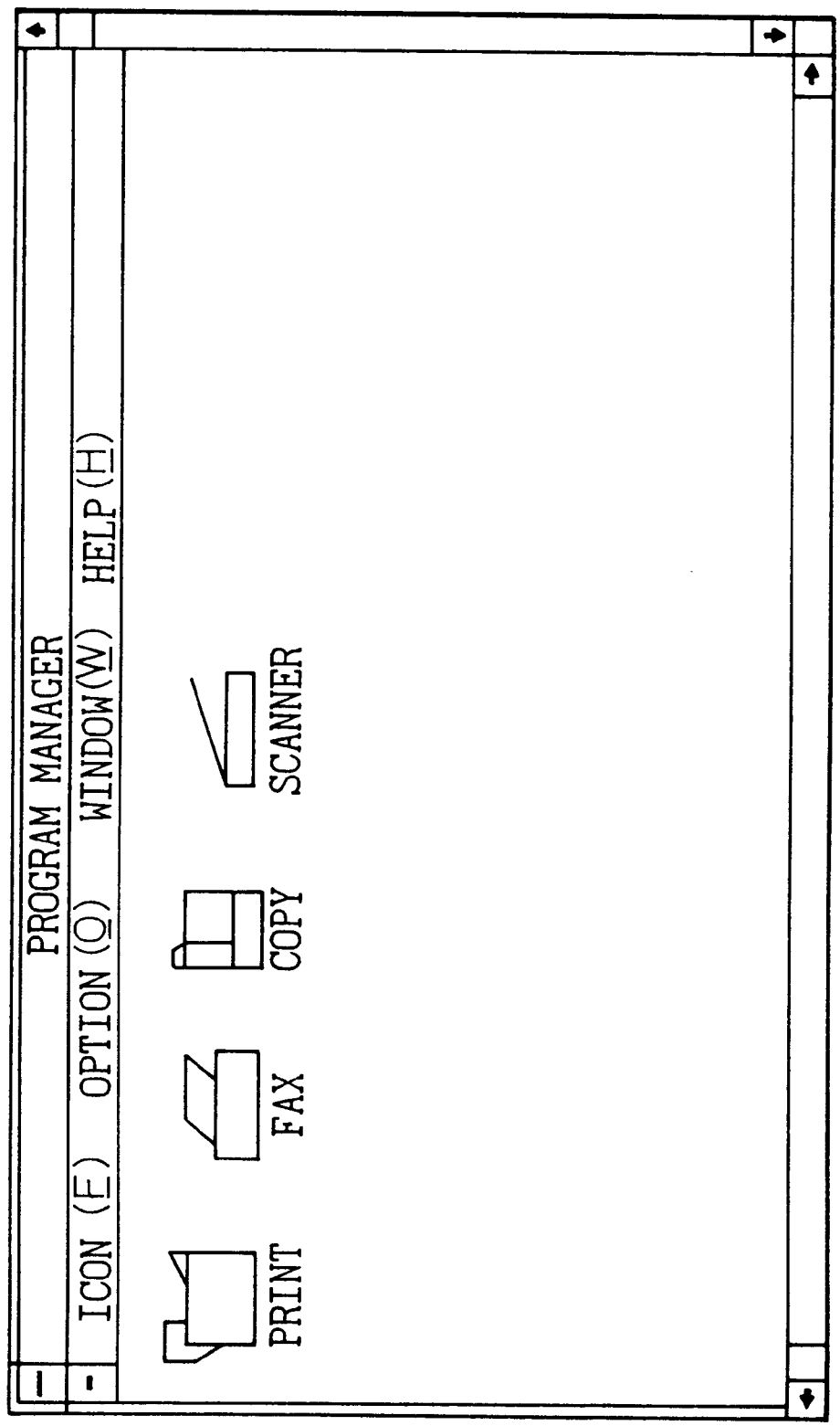
FIG. 3 is a diagram showing an example of a display for selecting a function.

Functions can, as shown in FIG. 3, be selected on the display unit 21 of the client 2. On the display unit 21 shown in FIG. 3, any of icons associated with displayed functions is selected by clicking a button of a pointing device such as a mouse in order to activate the selected function. The actions of the client 2 will be described.

To begin with, the capability of a scanner of a client has will be described. A scanning function is used to input image data from paper from the scanner 5. The input image data is filed, or used as data to be transmitted by facsimile or as data to be copied.

Figure 4:
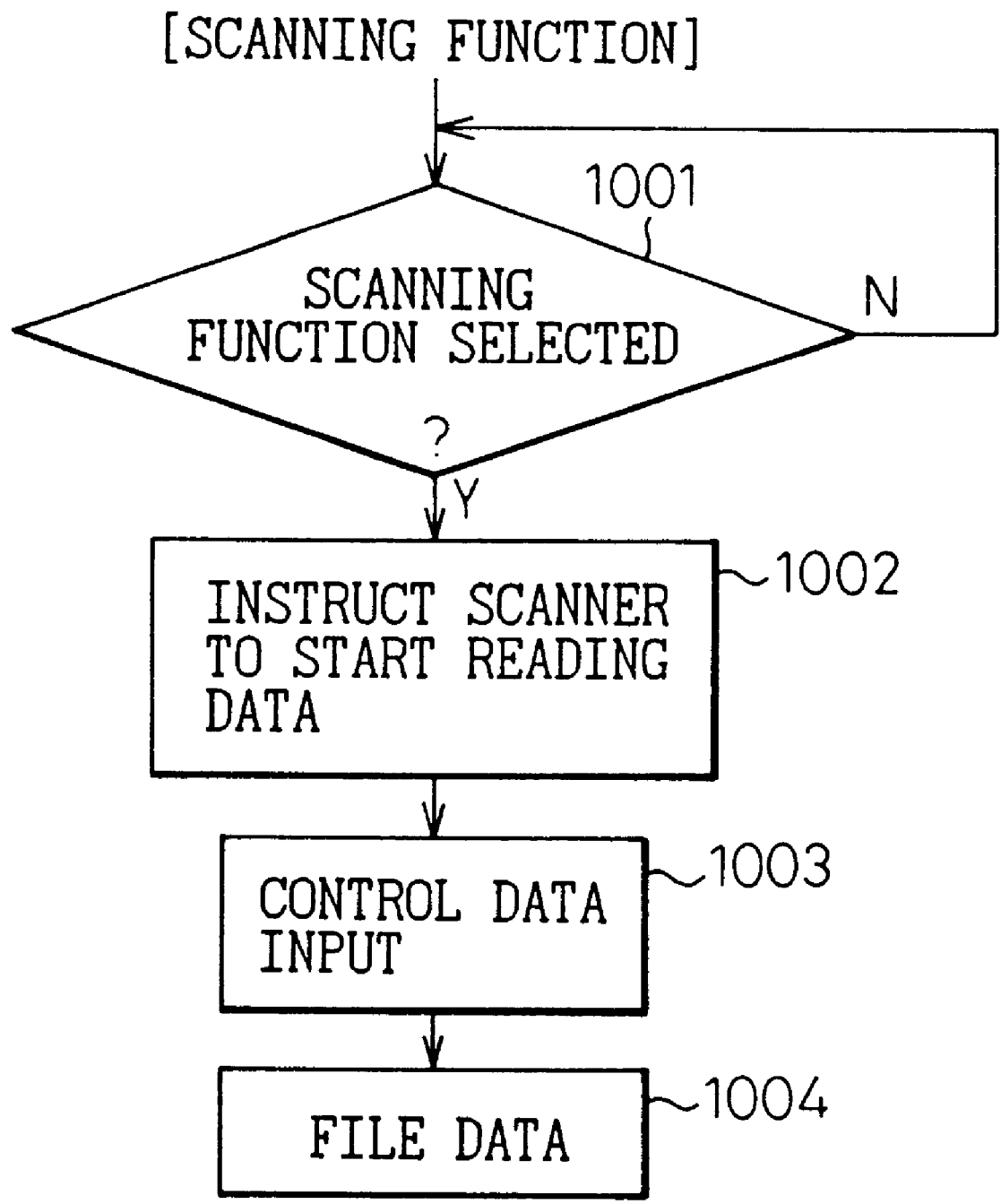
FIG. 4 is a flowchart describing scanning.

For activating the scanning function, an associated icon should be selected with a click. A description will be made in conjunction with the flowchart of scanning described in FIG. 4.

When the GUI 131 detects the fact that the scanning function is selected with a click (step 1001), an instruction executor 136 instructs the scanner 5 via the scanner interface 12 to start reading a paper (step 1002). With this instruction, the scanner 5 starts reading the paper. Image data from the paper read by the scanner 5 is input via the scanner interface 12 under the control of a data input controller 132 (step 1003). The data input controller 132 monitors reception of data from the scanner 5. In case of an abnormality, control is given in order to display the fact on the display unit 21.

Data input via the scanner interface 12 is stored. This storing involves, for example, a hard disk in the client. Alternatively, the input data is transmitted to the server 3 over the network 1 and filed in the server 3 (step 1004).

Figure 5:
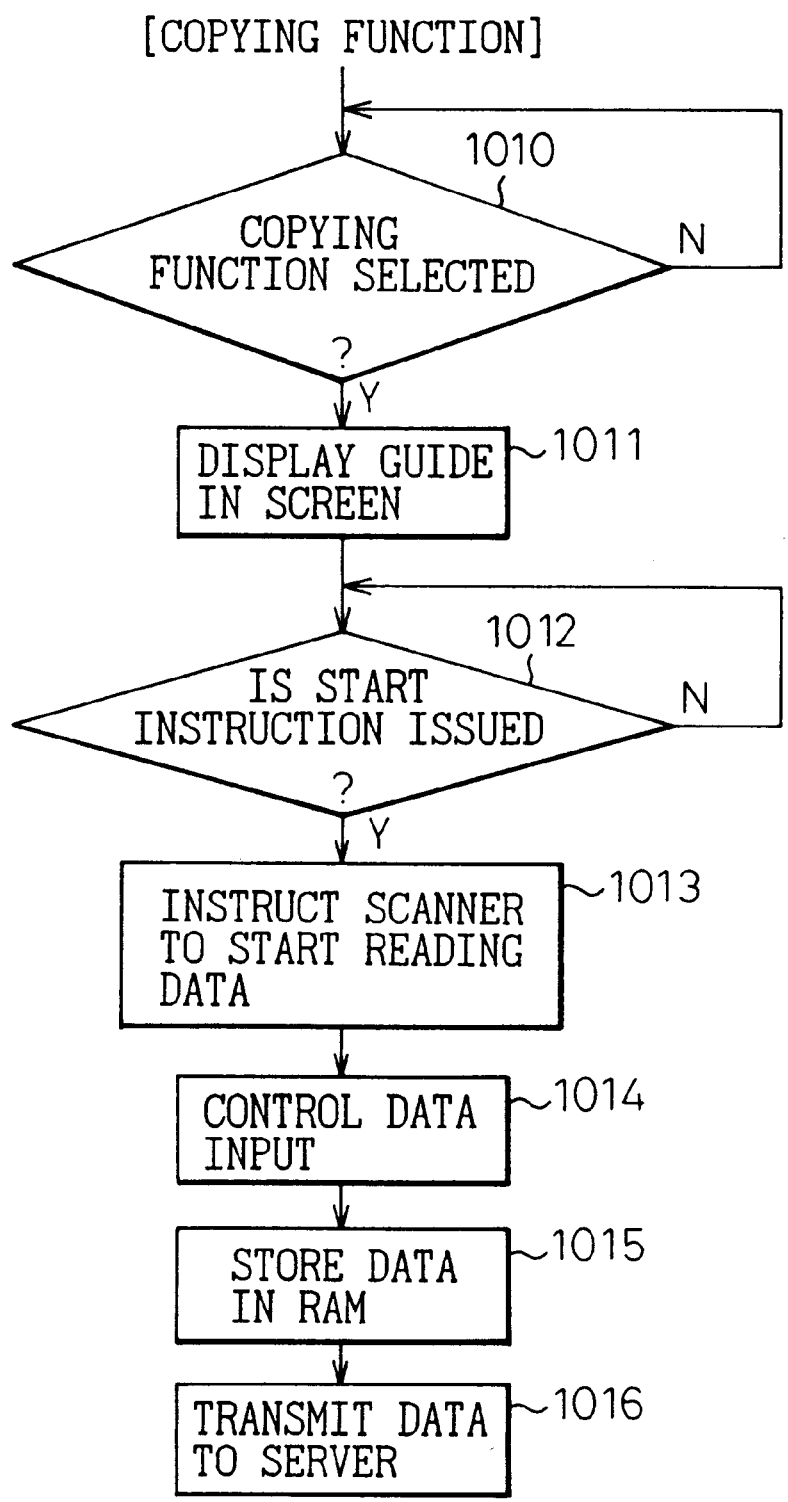
FIG. 5 is a flowchart describing copying.

Next, a copying function of the client 2 will be described. Using the copying function, image data of a paper scanned by the scanner 5 is input. The input image data is printed by the printer 4 connected over the network. Thus, digital copying is enabled. A description will be made in conjunction with the flowchart of copying in FIG. 5.

Figure 6:
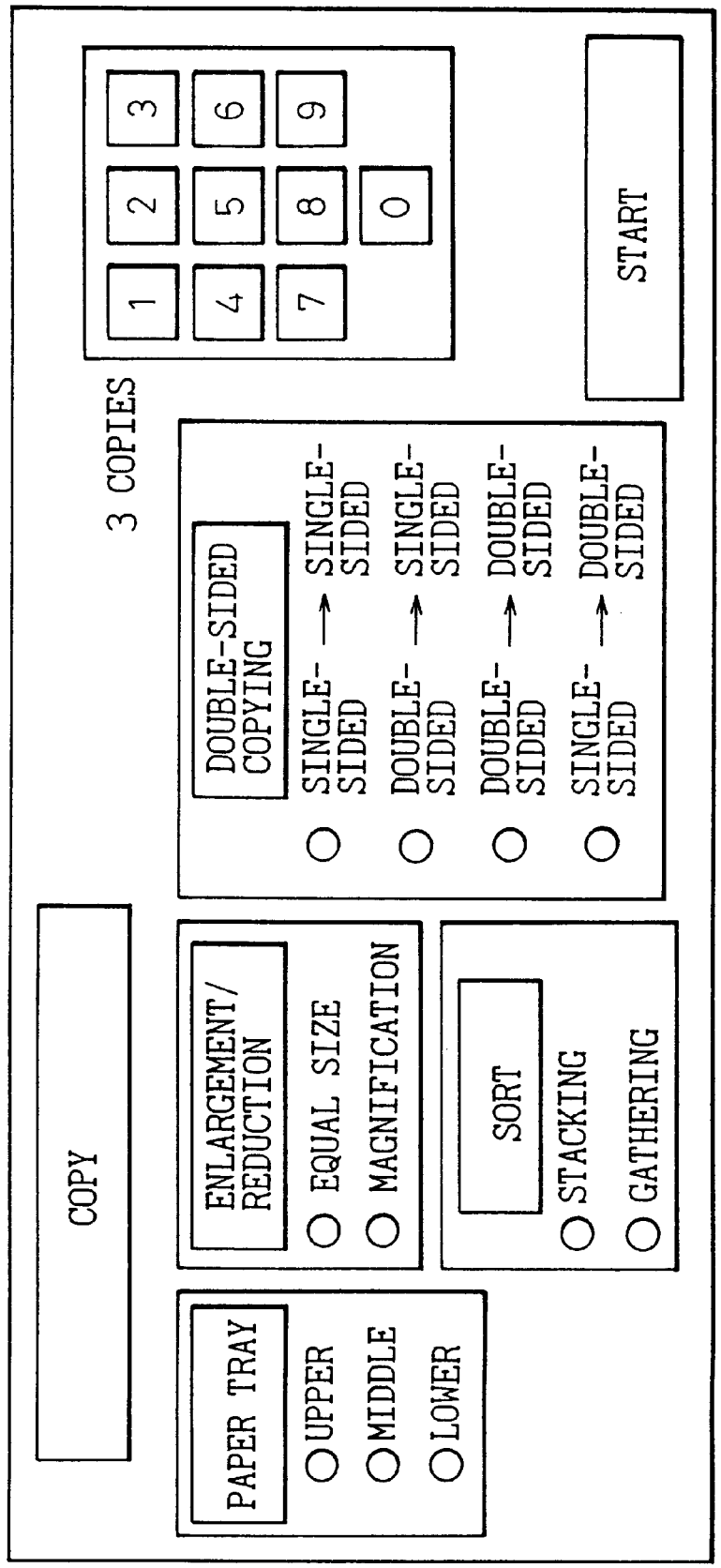
FIG. 6 is a diagram showing a copy menu.

When a copying GUI 131 detects the fact that an icon associated with copying in the function selection screen shown in FIG. 3 is selected with a click (step 1010), the display of the display unit 21 is changed to the one for copying shown in FIG. 6 (step 1011).

In this screen, an operator is prompted to enter information necessary for copying, such as, the number of copies, a double-sided or single-sided mode, an enlargement or reduction mode, a sorting method (stacking or gathering), and a kind of paper tray (size of paper) by means of a keyboard or pointing device. When information entry is completed, the operator clicks a button on the pointing device so as to designate a start position. When the copying GUI 131 detects the fact that starting copying is instructed (step 1012), the instruction executor 136 instructs the scanner 5 via the scanner interface 12 to start reading a paper (step 1013). With the instruction, the scanner 5 starts reading the paper. Image data of the paper read by the scanner 5 is input via the scanner interface 12 under the control of the data input controller 132 (step 1014). The data input controller 132 monitors reception of data from the scanner 5. In case of an abnormality, control is given so that the fact will be displayed on the display unit 21.

Data input via the scanner interface 12 is stored temporarily in a random access memory (step 1015). Image data stored in the random access memory is transmitted together with the conditions for copying including the number of copies, an enlargement or reduction mode, and the like to the server 3 over the network 1 (step 1016). The image data is transmitted to the printer 4. The printer 4 prints the image data under the designated conditions including the number of copies.

Figure 7:
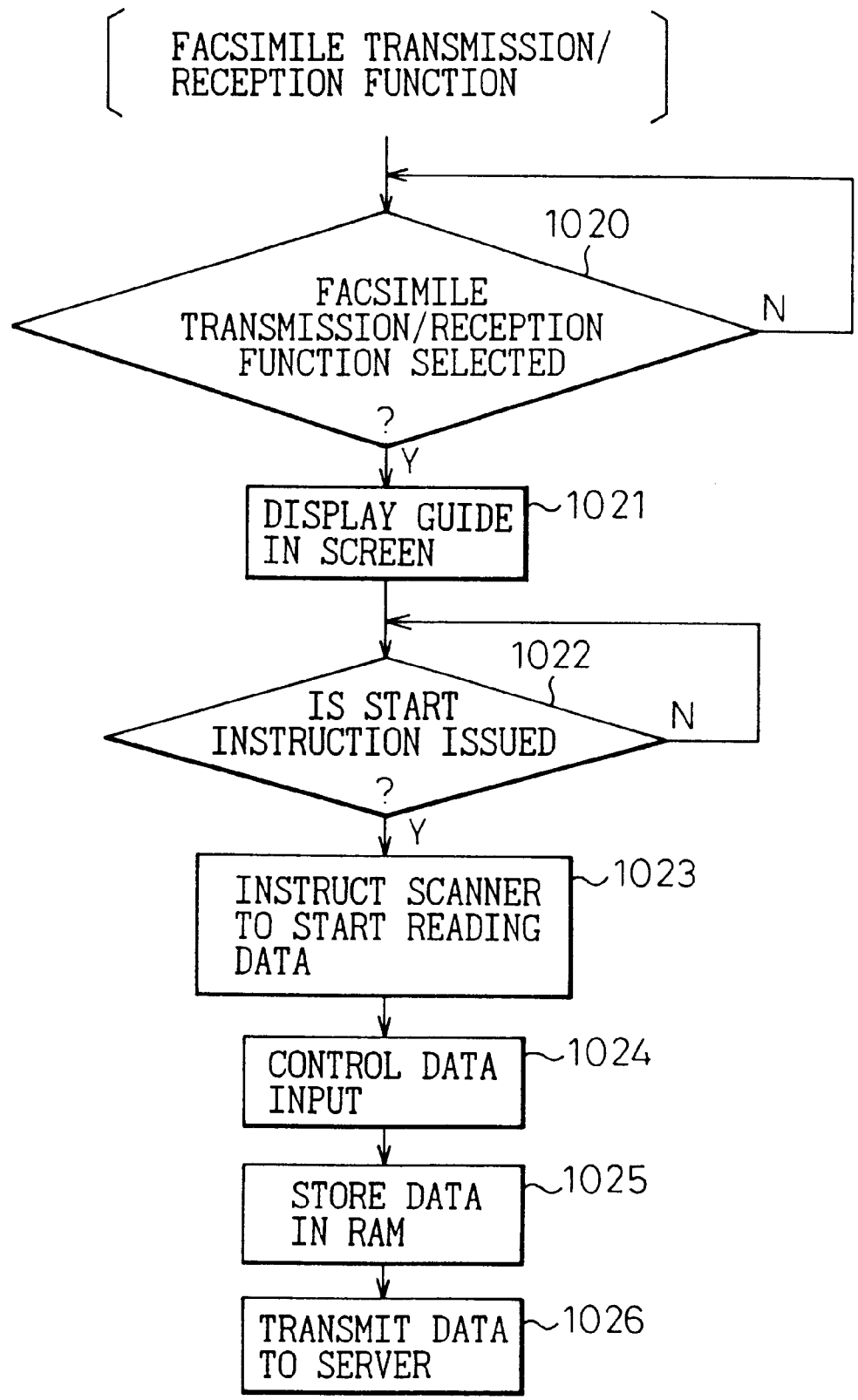
FIG. 7 is a flowchart describing facsimile transmission/reception.

Next, a facsimile transmission/reception function of a client will be described. The facsimile transmission/reception function is used to input image data of a paper from the scanner 5. The input image data is transmitted to the server 3, and transmitted to a destination facsimile system over a switched line by means of the FAX adaptor 6 of the server. A description will be made in conjunction with the flowchart of facsimile transmission/reception in FIG. 7.

Figure 8:
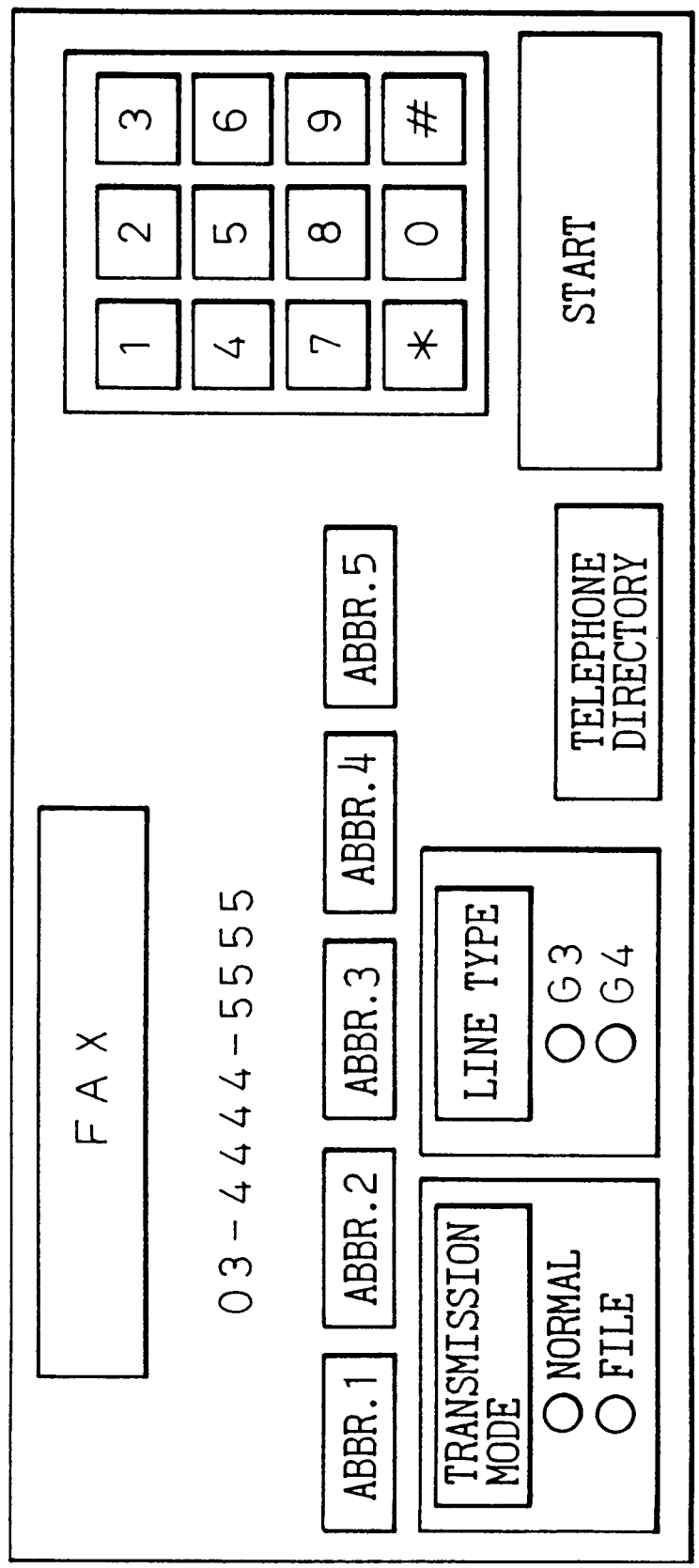
FIG. 8 is a diagram showing a facsimile menu.

When a facsimile transmission/reception GUI 131 detects the fact that an icon associated with the facsimile transmission/reception function in the function selection screen shown in FIG. 3 is selected with a click (step 1020), the display of the display unit 21 changes to the one for the facsimile transmission/reception function shown in FIG. 8 (step 1021).

In this screen, an operator is prompted to enter information necessary for facsimile transmission, such as, a telephone number of a destination of facsimile transmission, a transmission mode (normal or fine), and a line type (G3 or G4) by means of a keyboard or a pointing device. When information entry is completed, the operator clicks a button on the pointing device so as to designate a start position. When the facsimile transmission/reception GUI 131 detects the fact that starting facsimile transmission is instructed (step 1022), the instruction executor 136 instructs the scanner 5 via the scanner interface 12 to start reading paper (step 1023). With this instruction, the scanner 5 starts reading the paper. Image data from the paper read by the scanner 5 is input via the scanner interface 12 under the control of the data input controller 132 (step 1024). The data input controller 132 monitors reception of data from the scanner 5. In case of an abnormality, control is given so that the fact will be displayed on the display unit 21.

Data input via the scanner interface 12 is stored temporarily in the random access memory (step 1025). The image data stored in the random access memory is transmitted together with information necessary for facsimile transmission including a transmission destination to the server 3 over the network 1 (step 1026). The image data is then transmitted to the destination from the FAX adaptor 6 of the server 3 over a switched line.

The facsimile transmission/reception function not only transmits image data input from the scanner 5 but also transmits document information produced by utilizing software of a word-processor running in the client 2 together with information of a facsimile transmission destination. The document information is then transmitted to the transmission destination through the FAX adaptor 6.

As mentioned above, data transmitted from the client 2 over the network is managed by the server 3.

The actions of the server 3 will be described below. The server 3 shown in FIGS. 2A and 2B is connected over the network 1 via a network adaptor 31. Moreover, a FAX adaptor 6 is connected to the server 3 via an external interface 32. The FAX adaptor 6 is connected on a switched line, and transmits or receives data to or from another facsimile system over the switched line.

The server 3 includes a reception buffer 36 for receiving data over the network 1. Data transmitted over the network 1 is stored temporarily in the buffer 36.

The server 3 also includes a file 35 used to file data. The file is a large-capacity storage device such as a hard disk.

The server 3 further includes software 33 for controlling respective devices.

Figure 9:
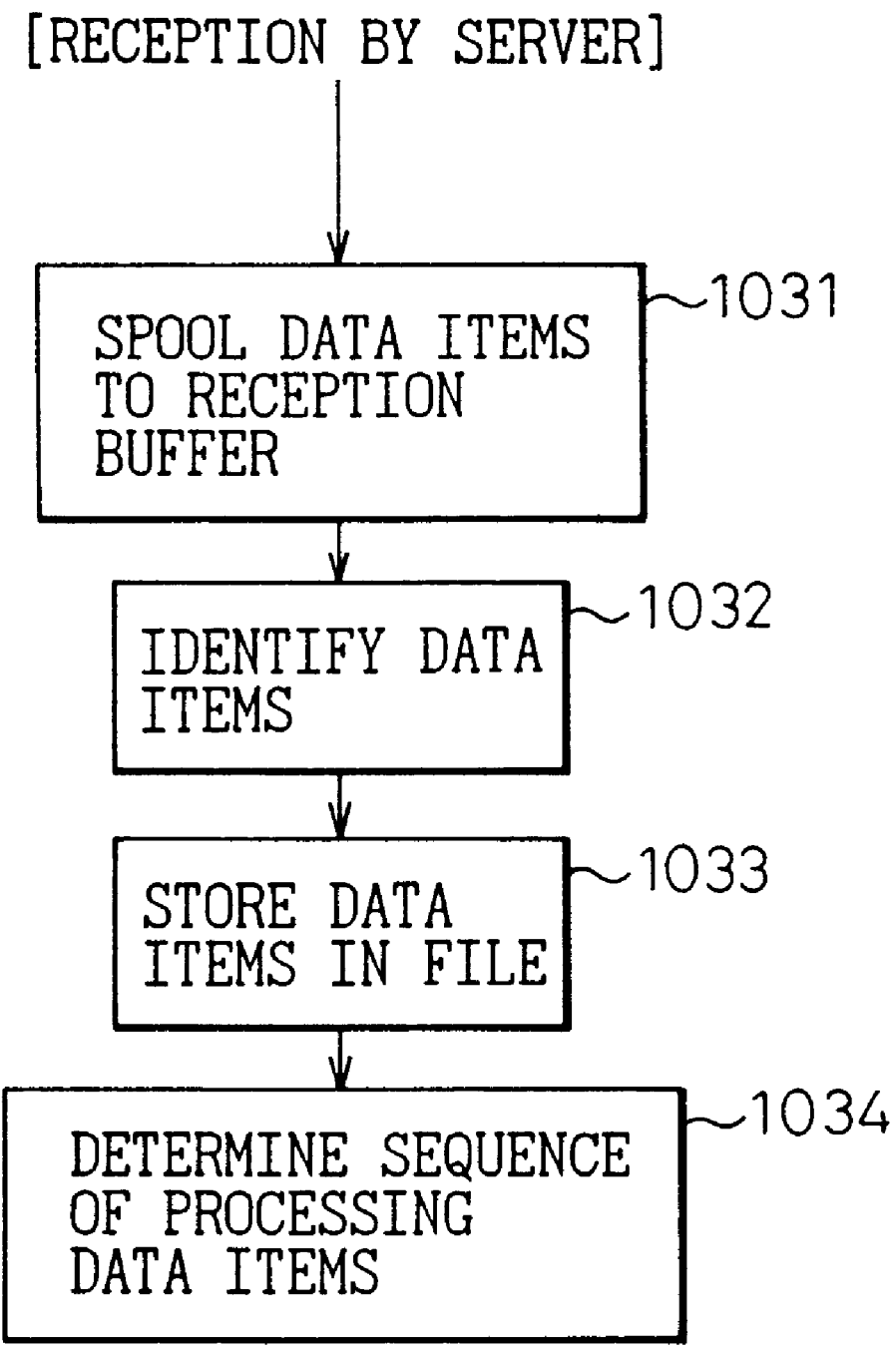
FIG. 9 is a flowchart describing data reception over a network.

Next, data reception by the server 3 will be described. To begin with, data reception over a network will be described. FIG. 9 is a flowchart describing data reception over a network. When data is transmitted from clients 2 over the network 1, the data items transmitted from the clients 2 are placed in the reception buffer 36 in the order in which the data items are received (step 1031). For data transfer over the network 1, control is given by a communication control unit 34. Received data is stored in the reception buffer 36 by a client resource manager 331.

Figure 10:
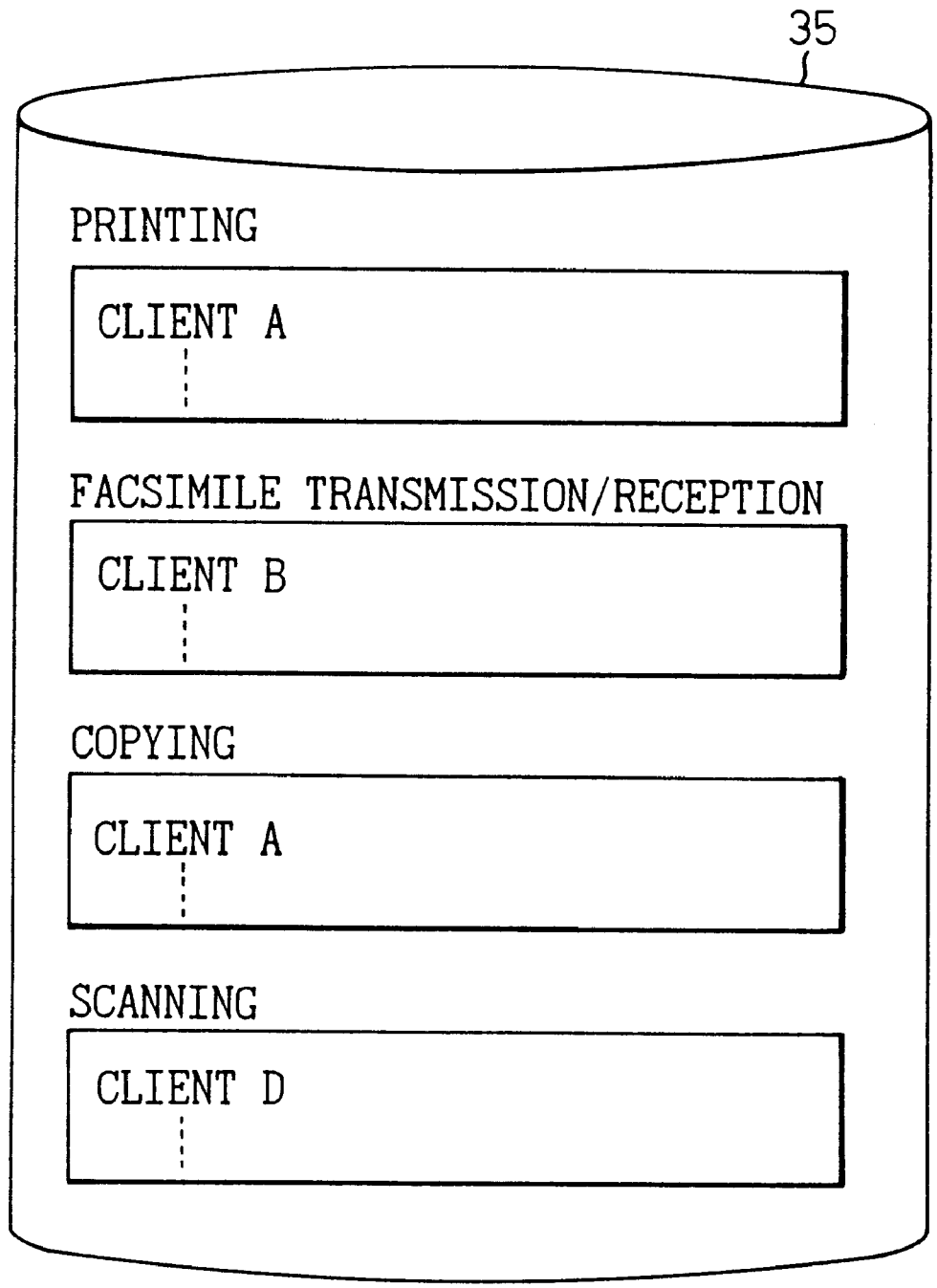
FIG. 10 is a diagram showing a file structure.

Data items placed in the reception buffer 36 are checked to identify clients 2 from which the data items are received and functions which are concerned with the data items (step 1032). Based on the results of identification, the received data items are rearranged in a data format according to which data items are sorted by function as shown in FIG. 10, and then stored in the file 35 (step 1033). The function-by-function data format is a data format according to which text data is differentiated from image data, and image data is classified into a TIF or BMP.

An executor 333 determines a sequence of processing received data items and executes processing (step 1034). If the processing is copying or printing, the executor 333 asks the printer over the network 1 to print data. If the processing is facsimile transmission, the data is transmitted to a destination facsimile system via the FAX adaptor 6 over a switched line. If the processing is filing, the data is stored in the file 35.

Figure 11:
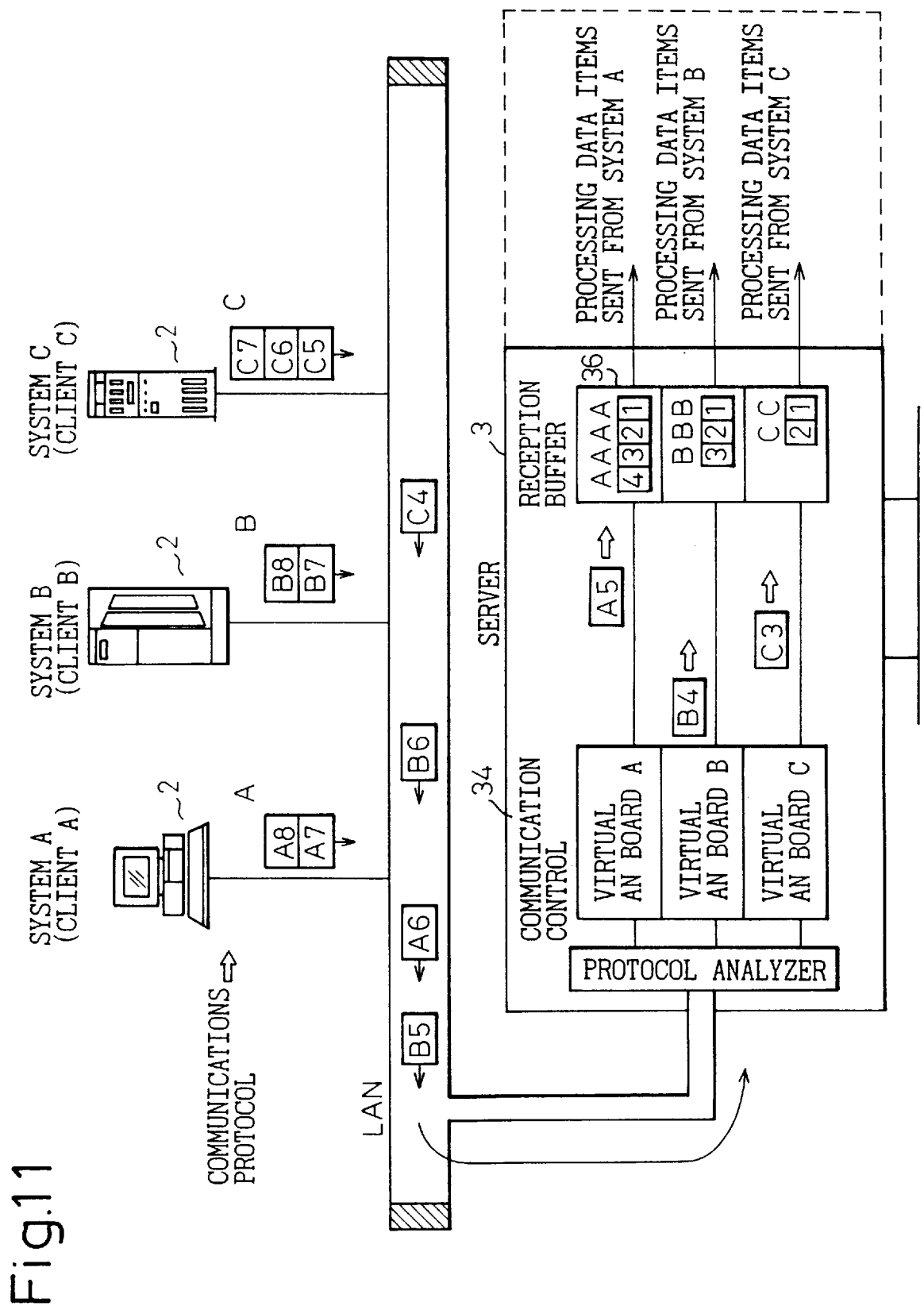
FIG. 11 is a diagram showing another network system configuration.

Next, a description will be made of a situation in which computers conformable to different communications protocols are interconnected. As shown in FIG. 11, in the case of an open system in which clients conformable to different communications protocols (for example, TCP/IP, SNA, and X.25) are interconnected over the network 1, a server 3 is designed to cope with the protocols. Thus, a composite system can be constructed.

Specifically, a protocol analyzer for analyzing a communications protocol for data reception is included in the communication control unit 34 of the server 3 so that data transmitted from the clients 2 can be received. The protocol analyzer checks a communications protocol adopted in a transmission side, and receives transmitted data. The received data items are stored in the reception buffer 36 in relation to the clients 2. Data transfer is usually carried out in packets. When all the packets constituting one data item have been received, the packets are stored as one data item function by function in the file 35.

Next, data reception via a FAX adaptor will be described. The FAX adaptor 6 is used to enable communication with a destination facsimile system. Facsimile data received via the FAX adaptor 6 and external interface 32 is stored in a FAX file storage position in the file 35 by means of a FAX server controller 332.

Figure 12:
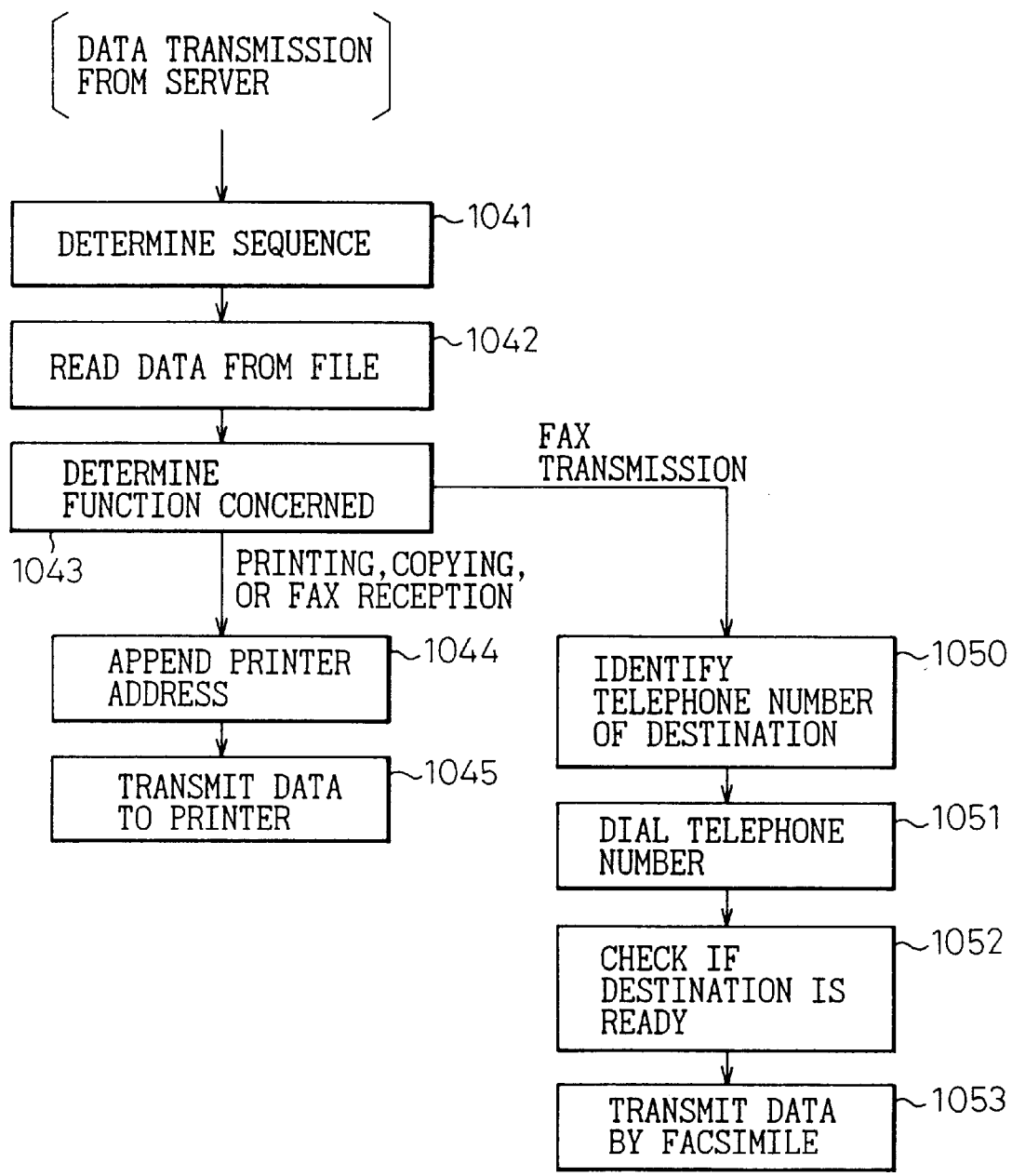
FIG. 12 is a flowchart describing transmission from a server.

Next, data transmission from the server 3 over a network will be described. Data received by the server 3 is stored function by function in the file 35 as shown in FIG. 10. Transmission will be described in conjunction with FIG. 12.

The executor 333 determines a sequence of processing data items stored in the file 35 (step 1041). The sequence may be the order in which data items are received or a sequence enabling parallel execution of a plurality of kinds of processing for improved processing efficiency. For example, a sequence is determined in consideration of kinds of processing that can be executed in parallel, for example, creation of packets needed to transmit data over the network 1 and compression of data to be transmitted by facsimile.

The executor 333 reads data from the file 35 via a file output controller 335 (step 1042), and identifies the read data or checks the read data to see with which function of printing, copying, facsimile reception, or facsimile transmission the read data is concerned (step 1043). If data to be processed is data to be printed, copied, or received by facsimile, it is necessary to print out the data. In this case, therefore, the printer 4 is asked to print data. For facsimile transmission, data is transmitted over a switched line via the FAX adaptor 6.

As for data to be printed, copied, or received by facsimile, data read from the file 35 is split into packets, and then an address of the printer 4 is appended to the packets by a client resource manager 331 (step 1044). The resultant packets are then transmitted to the printer 4 through the communication control unit 34 and network adaptor 31.

After receiving a plurality of packets, which constitute one data item and are transmitted from the server 3, via the network adaptor 41, the printer 4 prints the data under the conditions for printing contained in the data. Any printer ranging from a printer including only one stacker to a printer including a plurality of stackers can be connected as the printer 4. Depending on a system scale, a customer may select any printer freely.

A printer including only one stacker prints data items in the order in which the data items are received. A printer including a plurality of stackers can allocate the stackers to clients 2, and output printouts, which are concerned with printing requests sent from the clients, to the associated stackers. The operators of the clients 2 can receive printed-out sheets of paper at one time. For example, the printer 4 includes printer control software acting as a plurality of logic printers. In each logic printer, data items concerning respective functions are developed in a bit-mapped memory, printed on sheets of paper supplied through a paper feed port in the order in which the data items are developed, and then ejected through an ejection port. When ejection ports are allocated to the functions, printouts can separately be provided function by function. Moreover, if a large number of ejection ports are included, printouts concerning the functions may be provided in a mixed manner client by client. This helps each client receive printed-out sheets of paper readily.

Moreover, as for data items received by facsimile, as long as addresses of destinations are appended to the data items, printouts can be stored client by client.

When a plurality of stackers are assigned to functions, printouts provided by a printing function, printouts provided by a copying function, printouts of data received by facsimile may be stored separately in the stackers. In this case, the operator of each client 2 should merely search for a stacker assigned to a function he/she has executed so as to search for a desired printout. This obviates the necessity of installing the same number of stackers as the number of clients 2. The printer 4 may be a small-sized printer.

In the case of facsimile transmission (step 1043), the telephone number of a destination is identified using data read from the file 35 (step 1050), and the identified telephone number is dialed (step 1051). The dialing puts a client through to the destination. It is then checked if the destination has become ready to receive data (step 1052). After it is confirmed that the destination has become ready to receive data, data transmission is started (step 1053).

The data input controller 132, instruction executor 136, file manager 133, data converter 134, and data output controller 135 installed in each client 2, and the file input controller 334, file output controller 335, and executor 333 installed in the server 3, which have been described in conjunction with the aforesaid embodiment, are software. When the software is installed in each of the clients 2 and server 3 constituting an already-constructed client/server system, if existing hardware devices and software packages are used to execute processing under the installed software, this embodiment can be realized.

The software is supplied to users in the form of a floppy disk, CD-ROM, or the like. A user installs the software in a hard disk in each of clients and a server constituting an existing client/server system, whereby a system can be started up.

According to the present invention, once existing computers are used in combination with an existing network system, copying, printing, facsimile transmission/reception, and filing functions can be provided. Eventually, multiple functions can be provided despite the low cost of the system.

Furthermore, if a network system is already constructed, a multifunction system can be provided merely by installing software in each of clients and a server.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A network system which forms a client server, comprising:
    (a) a printer for carrying out printing;
    (b) a plurality of clients for outputting various requests including a printing request and facsimile transmission request; and
    (c) a server designed to carry out processing in response to requests sent from said plurality of clients over a network, said server being connected on a facsimile transmission/reception line, and including:
        (1) a means that, when a client issues a printing request, outputs a printing instruction to said printer,
        (2) a means that, when a client issues a facsimile transmission request, transmits data over said facsimile transmission/reception line,
        (3) a means, when data is transmitted to the network system over said facsimile transmission/reception line, for receiving the transmitted data;
        (4) a means for managing data received over the network and over said facsimile transmission/reception line by storing in order the received data and rearranging or sorting by function the received data, and
        (5) a means for storing the received data in relation to functions and clients.

2. The network system according to claim 1, wherein said clients each include a scanner for inputting images as image information, and input information sent from said scanner is used as an object of a facsimile transmission request issued from a client to said server.

3. The network system according to claim 1, wherein said server instructs said printer to print data received over said facsimile transmission/reception line.

4. The network system according to claim 3, wherein said printer includes sorters for sorting printed sheets of paper, and divides data items, which have been received over said facsimile transmission/reception line in response to printing instructions sent from said server, into said sorters in relation to addressees.

5. The network system according to claim 1, wherein said server is designed to be able to store a plurality of data items received over said facsimile transmission/reception line, and instructs said printer to print the stored data items.

6. A server for constituting a network system together with a plurality of clients for outputting requests and a printer for carrying out printing, comprising:
   (a) a means for carrying out processing in response to requests sent from said plurality of clients;
   (b) a means for transmitting or receiving data over a facsimile transmission/reception line on which said server is connected;
   (c) a means for distinguishing each object data of printout requests sent from said clients, object data of facsimile transmission requests sent from said clients, and data received over said facsimile transmission/reception line from each other, storing object data of printout requests sent from said clients, storing object data of facsimile transmission requests sent from said clients, and storing data received over said facsimile transmission/reception line; and
   (d) a means for managing data received over the network and over said facsimile transmission/reception line by storing in order the received data and rearranging or sorting by function the received data.

7. The server according to claim 6, wherein data items stored in said storage means are distributed to output destinations.

8. A storage device for a program to be installed in a server that constitutes a network system together with a plurality of clients for outputting requests and a printer for carrying out printing, carries out processing in response to requests sent from said plurality of clients, and is connected on a facsimile transmission/reception line, said program comprising the steps of:
   (a) receiving printout requests, copy requests, and facsimile transmission requests from said clients;
   (b) receiving data transmitted over said facsimile transmission/reception line;
   (c) when receiving a printout request or copy request from a client or receiving data over said facsimile transmission/reception line, requesting said printer to provide printouts;
   (d) when receiving a facsimile transmission request from a client, transmitting data over said facsimile transmission/reception line;
   (e) managing data received over the network and over said facsimile transmission/reception line by storing in order the received data and rearranging or sorting by function the received data; and
   (f) a means for storing the received data in relation to functions and clients.

9. A network system which forms a client server system, comprising:
   (a) a printer for carrying out printing;
   (b) a scanner for carrying out scanning;
   (c) a plurality of clients for outputting various requests including a printing request, copying request, and facsimile transmission request; and
   (d) a server designed to carry out processing in response to requests sent from said plurality of clients over a network, said server being connected on a facsimile transmission/reception line, and including:
      (1) a means that, when a client issues a printing request, outputs a printing instruction to said printer,
      (2) a means that, when a client issues a copying request, inputs a scanning instruction to said scanner and outputs a copying instruction to said printer,
      (3) a means that, when a client issues a facsimile transmission request, transmits data over said facsimile transmission/reception line, and
      (4) a means, when data is transmitted to the network system over said facsimile transmission/reception line, for receiving the transmitted data;
      (5) a means for managing data received over the network and over said facsimile transmission/reception line by storing in order the received data and rearranging or sorting by function the received data; and
      (6) a means for storing the received data in relation to functions and clients.

10. The network system according to claim 9, wherein said clients each include a scanner for inputting images as image information, and input information sent from said scanner is used as an object of a copying request and a facsimile transmission request issued from a client to said server.

* * * * *